United States Patent
Wakita

(10) Patent No.: US 9,144,924 B2
(45) Date of Patent: Sep. 29, 2015

(54) THERMOPLASTIC RESIN COMPOSITION FOR CLEANING MOLDING PROCESSING MACHINE

(71) Applicant: DAICEL POLYMER LTD., Minato-ku, Tokyo (JP)

(72) Inventor: Naoki Wakita, Himeji (JP)

(73) Assignee: DAICEL POLYMER LTD., Minato-ku, Tokyo (JP)

( * ) Notice: Subject to any disclaimer, the term of this patent is extended or adjusted under 35 U.S.C. 154(b) by 0 days.

(21) Appl. No.: 14/373,469

(22) PCT Filed: Jan. 15, 2013

(86) PCT No.: PCT/JP2013/050511
§ 371 (c)(1),
(2) Date: Jul. 21, 2014

(87) PCT Pub. No.: WO2013/111633
PCT Pub. Date: Aug. 1, 2013

(65) Prior Publication Data
US 2014/0371125 A1 Dec. 18, 2014

(30) Foreign Application Priority Data

Jan. 27, 2012 (JP) .................................. 2012-014738

(51) Int. Cl.
| | | |
|---|---|---|
| *C11D 1/04* | (2006.01) | |
| *C11D 1/83* | (2006.01) | |
| *C11D 3/37* | (2006.01) | |
| *C11D 7/36* | (2006.01) | |
| *C11D 9/34* | (2006.01) | |
| *B29C 33/72* | (2006.01) | |
| *C08K 5/098* | (2006.01) | |
| *C08K 5/103* | (2006.01) | |
| *C11D 1/34* | (2006.01) | |
| *C08K 5/521* | (2006.01) | |
| *C08L 25/04* | (2006.01) | |
| *C08L 33/12* | (2006.01) | |
| *C11D 1/66* | (2006.01) | |
| *C11D 3/06* | (2006.01) | |
| *C11D 3/20* | (2006.01) | |
| *C11D 11/00* | (2006.01) | |
| *C11D 3/36* | (2006.01) | |
| *C08L 33/08* | (2006.01) | |
| *B29L 31/00* | (2006.01) | |

(52) U.S. Cl.
CPC ............... *B29C 33/722* (2013.01); *B29C 33/72* (2013.01); *C08K 5/098* (2013.01); *C08K 5/103* (2013.01); *C08K 5/521* (2013.01); *C08L 25/04* (2013.01); *C08L 33/12* (2013.01); *C11D 1/04* (2013.01); *C11D 1/34* (2013.01); *C11D 1/66* (2013.01); *C11D 3/06* (2013.01); *C11D 3/2075* (2013.01); *C11D 3/362* (2013.01); *C11D 3/37* (2013.01); *C11D 3/3746* (2013.01); *C11D 3/3749* (2013.01); *C11D 11/0041* (2013.01); *B29L 2031/757* (2013.01); *C08L 33/08* (2013.01)

(58) Field of Classification Search
CPC ............ C11D 1/04; C11D 1/667; C11D 1/83; C11D 3/362; C11D 3/37; C11D 3/393; C11D 7/36; C11D 9/225; C11D 9/34
See application file for complete search history.

(56) References Cited

U.S. PATENT DOCUMENTS

| | | | | |
|---|---|---|---|---|
| 3,860,521 | A * | 1/1975 | Aepli et al. ................... | 508/438 |
| 2015/0021802 | A1 * | 1/2015 | Wakita ............................ | 264/39 |

FOREIGN PATENT DOCUMENTS

| | | |
|---|---|---|
| JP | 08-027335 A | 1/1996 |
| JP | 09-208992 A | 8/1997 |
| JP | 10-279816 A | 10/1998 |
| JP | 2002-001734 A | 1/2002 |
| JP | 2006-257297 A | 9/2006 |
| JP | 2007-021765 A | 2/2007 |
| JP | 2010-095624 A | 4/2010 |
| JP | 2010-095625 A | 4/2010 |
| JP | 2010-189515 A | 9/2010 |
| JP | 2011-046808 A | 3/2011 |

OTHER PUBLICATIONS

International Search Report for PCT/JP2013/050511 (2 pgs.).
English translation of International Preliminary Report on Patentability and Written Opinion of the International Searching Authority for PCT/JP2013/050511 (7 pages).

* cited by examiner

*Primary Examiner* — Charles Boyer
(74) *Attorney, Agent, or Firm* — Flynn, Thiel, Boutell & Tanis, P.C.

(57) ABSTRACT

To provide a thermoplastic resin composition for cleaning a molding processing machine, which has good cleaning performance and workability in cleaning an inner side of a molding processing machine of thermoplastic resin, such as an extruder and an injection molding machine. A thermoplastic resin composition for cleaning a molding processing machine, which includes (A) a thermoplastic resin containing a styrene-based resin, (B) an alkaline metal salt of a fatty acid, (C) a nonionic surfactant, and (D) a metal salt of an acidic phosphoric ester.

7 Claims, No Drawings

THERMOPLASTIC RESIN COMPOSITION FOR CLEANING MOLDING PROCESSING MACHINE

TECHNICAL FIELD

The present invention relates to a thermoplastic resin composition for cleaning a molding processing machine, which cleans a molding processing machine such as an extruder or an injection molding machine.

BACKGROUND ART

As a cleaning agent for cleaning a molding processing machine of a thermoplastic resin composition, there is known one obtained by combining a base resin and other components.

In JP-A 2010-95624, JP-A 2010-95625, JP-A 2011-46808, JP-A 10-279816, and JP-A 2007-21765, there are disclosed cleaning compositions in which a base resin and an anionic surfactant are combined.

SUMMARY OF THE INVENTION

The problem to be solved by the present invention is to provide a thermoplastic resin composition for cleaning a molding processing machine, in which cleaning performance is further enhanced by combining a base resin and a surfactant.

The present invention has been completed by finding that cleaning performance is further enhanced and that workability is also enhanced by, when combining a base resin and a surfactant, combining a nonionic surfactant and further combining a metal salt of an acidic phosphoric ester.

According to the present invention, there is provided a thermoplastic resin composition for cleaning a molding processing machine which contains:
(A) a thermoplastic resin containing a styrene-based resin,
(B) an alkaline metal salt of a fatty acid,
(C) a nonionic surfactant, and
(D) a metal salt of an acidic phosphoric ester.

The present invention can provide an application in which the aforementioned thermoplastic resin composition is used for cleaning a molding processing machine.

DETAILED DESCRIPTION OF THE INVENTION

According to the thermoplastic resin composition for the cleaning of the present invention, there are obtained good cleaning performance and workability in cleaning an inner side of a molding processing machine of thermoplastic resin, such as an extruder or an injection molding machine.

<Component (A)>

The styrene-based resin can include a copolymer (however, (meth)acrylic acid unit is not contained) other than PS resin (polystyrene homopolymer).

Examples of the copolymers can include one selected from ABS (acrylonitrile-butadiene-styrene) resin, AS (acrylonitrile-styrene) resin, ASA (acrylonitrile-styrene-acryl rubber) resin, AES (acrylonitrile-ethylene propylene rubber-styrene) resin, ACS (acrylonitrile-chlorinated polyethylene-styrene) resin, HIPS resin (impact resistant polystyrene), SB (styrene-butadiene) resin, SBS (styrene-butadiene-styrene) resin, SEBS (styrene-ethylene/butylene-styrene) resin, SIS (styrene-isoprene-styrene) resin, SIBS (styrene-isoprene/butadiene-styrene) resin, SEPS (styrene-ethylene/propylene-styrene) resin, and the like, and can also be used in combination thereof.

The resin containing (meth) acrylic ester unit can include one selected from MS (methyl methacrylate-styrene) resin, PMMA (polymethyl methacrylate) resin, a copolymer of maleic anhydride-styrene-MMA (methyl methacrylate), MBS (methyl methacrylate-butadiene-styrene) resin, MABS (methyl methacrylate-acrylonitrile-butadiene-styrene) resin, and the like, and can also be used in combination thereof.

The component (A) may be the styrene-based resin alone, or may be a mixture of the styrene-based resin and the resin containing methacrylic ester unit.

When manufacturing the aforementioned mixture, a content ratio of the styrene-based resin is preferably 60% by mass or more, more preferably 70% by mass or more.

<Component (B)>

The alkaline metal salt of a fatty acid (B) is preferably a Na, K, Li, Cs salt of a saturated or unsaturated fatty acid having 10 to 22 carbon atoms. The fatty acid may have a straight chain or a branched chain.

Among them, more preferable is a Na salt of a fatty acid having 12 to 18 carbon atoms (lauric acid, myristic acid, palmitic acid, stearic acid, oleic acid).

A content ratio of the alkaline metal salt of a fatty acid of the component (B) in the composition is 0.5 to 10 parts by mass relative to 100 parts by mass of the component (A), preferably 1 to 10 parts by mass, and more preferably 1 to 5 parts by mass.

<Component (C)>

Examples of the nonionic surfactant of the component (C) include one selected from an oxyethylene chain-type surfactant, a sorbitan ester-type surfactant, a glyceride-based (glycerine (mono, di) fatty acid esters) surfactant, a 12-hydroxystearic acid ester, a propylene glycol fatty acid ester, a sucrose fatty acid ester, an alkyl glyceryl ether, an alkyl glucoside, and the like.

Among them, preferable are one or more kinds selected from a sorbitan ester-type surfactant, a glyceride-based surfactant, a 12-hydroxystearic acid ester.

A content ratio of the nonionic surfactant of the component (C) in the composition is 0.5 to 10 parts by mass relative to 100 parts by mass of the component (A), preferably 1 to 10 parts by mass, and more preferably 1 to 5 parts by mass.

A content ratio of the component (B) in the total mass of the components (B) and the component (C) is preferably 30 to 70% by mass, more preferably 40 to 60% by mass, and a content ratio of the component (C) corresponds to a residual proportion.

<Component (D)>

The component (D) is a metal salt of an acidic phosphoric ester. The component (D) is a component which acts, when using the component (B) and the component (C) together, so as to prevent generation of a gas (gas that contains a fatty acid and the like) produced by decomposing the component (C) due to the action of the alkaline metal contained in the component (B).

As the component (D), there can be used, for example, a salt of an acidic phosphoric ester represented by the general formula (I) or (II) described from the paragraph 0021 to the paragraph 0032 of JP 2010-189515 A.

The preferable component (D) is magnesium stearyl acid phosphate, calcium stearyl acid phosphate, zinc stearyl acid phosphate, aluminum stearyl acid phosphate, and the like.

As the component (D), there can be used commercially available products, and there can be used, for example, zinc stearyl acid phosphate (LBT1830 manufactured by SAKAI Chemical Industry Co., Ltd.), aluminum stearyl acid phosphate (LBT1813 manufactured by SAKAI Chemical Industry Co., Ltd.), calcium stearyl acid phosphate (LBT1820 manufactured by SAKAI Chemical Industry Co., Ltd.), magnesium stearyl acid phosphate (LBT-1812), and the like.

A content ratio of the component (D) in the composition is preferably 5 to 80 parts by mass relative to 100 parts by mass of the total amount of the component (B) and the component (C), more preferably 10 to 70 parts by mass, and further preferably 15 to 60 parts by mass.

<Other Components>

The composition of the present invention can further contain an inorganic filler. The examples of the inorganic filler other than a well-known glass fiber and a metal fiber can include one selected from molten slag, steel slag or crushed materials thereof, artificial mineral fibers which are described in JP 2006-257297 A, and can be used in a fibrous or non-fibrous form (powder, granules, crushed materials, and the like).

The composition of the present invention can further include an alkylene glycol fatty acid ester, an organic phosphorous compound, a polyalcohol, a metal soap described in JP 2006-257297 A.

The composition of the present invention is manufactured by, after pre-mixing the aforementioned components with a mixer such as Henschel mixer, a tumbler blender or a kneader, kneading the resultant components with an extruder, or melt-kneading the components with heated rolls, and Banbury mixer.

EXAMPLES

Examples and Comparative Examples

The respective components having the compositions shown in Table 1 were mixed with a tumbler blender, and then melt-kneading with an extruder gives pelletized resin compositions. By using these compositions, the cleaning test was conducted according to the following method. The results are shown in Table 1.

As a precedent resin to be used, 1 kg of a red colored product of HDPE (concentration of red color 0.5%) was injection-molded with an injection molding machine ("SH100" manufactured by Sumitomo Heavy Industries, Ltd.; Cylinder temperature 230° C.).

After that, by using the composition of Table 1, procedures of weighting and injection were repeated, cleaning was terminated at the moment when the red color disappeared, and a cleaning ability was evaluated by the amount used (kg) of the component until then.

Furthermore, after the termination of cleaning, a cleaning ability (the presence or absence of the preceding material) was evaluated from the viewpoint of whether or not red color of the precedent resin (preceding material HDPE) can be observed when flowing an AS resin (Cevian N 050SF manufactured by Daicel Polymer LTD.).

TABLE 1

| | | Examples | | | Comparative Examples | | | | | |
|---|---|---|---|---|---|---|---|---|---|---|
| | | 1 | 2 | 3 | 1 | 2 | 3 | 4 | 5 | 6 |
| (A) | PS resin | 100 | 90 | 80 | 100 | 90 | 90 | 90 | 90 | 80 |
| | PMMA resin | | | 20 | | | | | | 20 |
| | MS resin | | 10 | | | 10 | 10 | 10 | 10 | |
| (B) | Stearic acid Na | 2.5 | 2.5 | 2.5 | 2.5 | 2.5 | 2.5 | | | 2.5 |
| (C) | Nonionic surfactant 1 | 2 | 2 | | 2 | 2 | | 2 | | |
| | Nonionic surfactant 2 | | | 2 | | | | | | |
| (D) | Salt of acidic phosphoric ester | 2.5 | 2.5 | 1 | | | | 2.5 | 2.5 | 2.5 |
| | Amount used (kg) of component | 1.0 | 0.5 | 1.0 | 1.5 | 0.5 | 1.5 | 2.0 | 3.0 | 1.0 |
| | Presence or absence of preceding material remaining | Not observed | Not observed | Not observed | Not observed | Not observed | Observed | Observed | Observed | Not observed |
| | Generation of gas | Not observed | Not observed | Not observed | Observed | Observed | Not observed | Not observed | Not observed | Observed |

Component (A)
PS resin: TOYO Styrol GP MW1C of TOYO Styrene Co., Ltd.
PMMA resin: ACRYPET MF of Mitsubishi Rayon Co., Ltd.
MS resin: Cevian MAS30 of Daicel Polymer LTD.
Component (B)
Na stearate
Component (C)
Nonionic surfactant 1: Glycerin hydroxystearate
Nonionic surfactant 2: Sorbitan stearate
Component (D)
Salt of acidic phosphoric ester: Zinc stearyl acid phosphate (LBT-1830 manufactured by SAKAI Chemical Industry Co., Ltd.)

The invention claimed is:

1. A thermoplastic resin composition for cleaning a molding processing machine, comprising:
   (A) a thermoplastic resin containing a styrene-based resin,
   (B) an alkaline metal salt of a fatty acid,
   (C) a nonionic surfactant, and
   (D) a metal salt of an acidic ester of phosphoric acid.

2. The thermoplastic resin composition for cleaning a molding processing machine according to claim 1,
   wherein, in the total mass of the components (B) and the component (C), a content ratio of the component (B) is 30 to 70% by mass, and a content ratio of the component (C) is 70 to 30% by mass, and
   wherein a content ratio of the component (D) is 10 to 100 parts by mass relative to 100 parts by mass of the total amount of the component (B) and the component (C).

3. The thermoplastic resin composition for cleaning a molding processing machine according to claim 1,
   wherein, the salt of an acidic ester of phosphoric acid of the component (D) is one selected from magnesium stearyl acid phosphate, calcium stearyl acid phosphate, zinc stearyl acid phosphate, and aluminum stearyl acid phosphate.

4. The thermoplastic resin composition for cleaning a molding processing machine according to claim 1,
   wherein the nonionic surfactant of the component (C) is one or more kinds selected from a sorbitan ester-type surfactant, and a glyceride-based surfactant.

5. The thermoplastic resin composition for cleaning a molding processing machine according to claim 1,
   wherein (A) the thermoplastic resin containing the styrene-based resin is a mixture of a styrene-based resin in which a (meth)acrylic acid unit is not contained and a resin containing a (meth)acrylic ester unit.

6. The thermoplastic resin composition for cleaning a molding processing machine according to claim 1, wherein the resin containing the (meth)acrylic ester unit is one or more kinds selected from MS resin, PMMA resin, a copolymer of maleic anhydride-styrene-MMA.

7. A method for cleaning a molding processing machine comprising contacting the molding processing machine with the thermoplastic resin composition of present claim 1.

* * * * *